US010540339B2

(12) United States Patent
Barak et al.

(10) Patent No.: US 10,540,339 B2
(45) Date of Patent: Jan. 21, 2020

(54) MATCHING A RESOURCE WITH A USER FOR A PREDICTED USER NEED (71) Applicant: Microsoft Technology Licensing, LLC, Redmond, WA (US)

(72) Inventors: Ori Barak, Hertzliya (IL); Ola Lavi, Hertzliya (IL); Erez Altus, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 15/599,794

(22) Filed: May 19, 2017

(65) Prior Publication Data
US 2018/0336233 A1 Nov. 22, 2018

(51) Int. Cl.
*G06F 16/22* (2019.01)
*G06F 16/13* (2019.01)
*G06F 16/182* (2019.01)

(52) U.S. Cl.
CPC .......... *G06F 16/2272* (2019.01); *G06F 16/13* (2019.01); *G06F 16/182* (2019.01)

(58) Field of Classification Search
CPC .......... G06F 17/30873; G06F 16/9535; G06F 16/2272; H04L 29/06; G06Q 10/10
See application file for complete search history.

(56) References Cited

U.S. PATENT DOCUMENTS

| | | | |
|---|---|---|---|
| 6,021,403 A | 2/2000 | Horvitz et al. | |
| 7,523,082 B2 | 4/2009 | Mohan | |
| 9,124,694 B2 | 9/2015 | Monegan et al. | |
| 9,519,938 B2 | 12/2016 | Spiegel | |
| 2002/0198991 A1* | 12/2002 | Gopalakrishnan | H04L 29/06 709/225 |
| 2004/0039775 A1* | 2/2004 | Yoshida | G06F 17/30873 709/203 |
| 2007/0294350 A1* | 12/2007 | Kumar | G06Q 10/10 709/205 |
| 2011/0035674 A1 | 2/2011 | Chenoweth et al. | |
| 2011/0191352 A1 | 8/2011 | Jones et al. | |
| 2012/0095978 A1* | 4/2012 | Levin | G06F 16/9535 707/706 |

(Continued)

OTHER PUBLICATIONS

Botla, Purushotham, "Designing Personal Assistant Software for Task Management using Semantic Web Technologies and Knowledge Databases", In Doctoral Dissertation of Massachusetts Institute of Technology, May 2013, 112 pages.

(Continued)

*Primary Examiner* — Etienne P Leroux
(74) *Attorney, Agent, or Firm* — Holzer Patel Drennan (57) ABSTRACT

A conversation assistance resource system is provided to connected a user to a resource based on a predicted user need. The conversation assistance resource system monitors user signals relative to a user profile associated with the user. The user profile is based on previously received user signals and includes user preferences, interests, etc. A user need is predicted based on a received user signal. A resource is identified based on the predicted user need and the user profile relative to the resource profile. A communication channel is established between the user and the resource responsive to confirmation by the parties such that the user may query the resource to resolve the predicted user need.

22 Claims, 7 Drawing Sheets

(56) References Cited

U.S. PATENT DOCUMENTS

2016/0132198 A1 5/2016 Sinclair et al.
2016/0323398 A1 11/2016 Guo et al.

OTHER PUBLICATIONS

Heredero, et al., "Activity Context-Aware System Architecture for Intelligent Natural Speech Based Interfaces", In Proceedings of Twenty-Seventh AAAI Conference on Artificial Intelligence, Jul. 14, 2013, pp. 21-35.

Hsieh, et al., "Immersive Recommendation: News and Event Recommendations Using Personal Digital Traces", In Proceedings of the 25th International Conference on World Wide Web, Apr. 11, 2016,, pp. 51-62.

"25 Customer Chat Tips to Reassure and Nurture Your Online Customers", https://web.archive.org/web/20140418155549/http:/blog.kissmetrics.com/25-live-customer-chat-tips/, Published on: Apr. 18, 2014, 15 pages.

Barak, et al., "Cortana Connect", https://indd.adobe.com/view/12ea9f2e-9740-4142-a3b1-5f437fa1ffb3, Published on: Jun. 2016, 10 pages.

* cited by examiner

MATCHING A RESOURCE WITH A USER FOR A PREDICTED USER NEED

BACKGROUND

When people need to find out information about a particular subject, such as a new city, new product, activities, etc., people generally utilize static information such as a website, book, pamphlet, etc. For example, when a person visits a new city, the person may search for restaurants using Yelp, find places of interest using TripAdvisor, or look for events using pamphlets, newspapers, etc. Such static information may not be useful or tailored for the particular person.

SUMMARY

In at least one implementation, a system includes a user need predictor, a matchmaking service, and a communications manager. The user need predictor is configured to predict a user need of a user associated with a user profile, the prediction based on a user signal of one or more user signals associated with the user profile. The matchmaking service is configured to identify at least one conversation assistance resource based on the predicted user need and a matching of the user profile with one or more profiles associated with potential conversation assistance resources. The communications manager is configured to establish a communication channel between the user and the identified conversation assistance resource responsive to identification of the at least one conversation assistance resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Users search for trusted recommendations in everyday life decisions such as buying products, selecting a restaurant, planning a vacation, etc. When people need to find out information about a particular subject, such as a new city, new product, activities, etc., users may utilize information websites such as Yelp, TripAdvisor, forums, etc. However, people tend to better trust other people from their inner circle or people who are a relatable because of similar interests, experiences, etc. Implementations described herein provide a customized interactive information resource experience.

As a user utilizes a device such as a mobile device, laptop, desktop, etc., information about the user is collected and utilized to build a user profile that is associated with the user. Such information may include the user's occupation, age, major hub's location (e.g., office or home), employer, food preferences, dietary preferences, entertainment preferences, places of interest visited in the past, games, news subscriptions, social media feeds, shopping preferences, sports preferences, events visited in the past, etc. Such information may be manually inferred by a device or entered manually by the user.

The user profile is accessed by a conversation assistance resource system. The conversation assistance resource system may monitor further actions, information, etc. detected by the user's device. The conversation assistance resource system predicts a user need based on such monitored user actions, information, etc. For example, the conversation assistance resource system may detect that the user is visiting/will visit a new city. Such detection may be based on detected travel itinerary (e.g., via an email or a calendar application). Based on the user profile associated with the user and the detected visit to the new city, the conversation assistance resource system predicts that the user needs, for example, restaurant, activity, and/or museum recommendations in the new city. Instead of directing the user to a static information resource (e.g., Yelp, TripAdvisor), the conversation assistance resource system identifies another user (e.g., a conversation assistance resource) that may be able to provide custom/interactive recommendations to the user.

In some example implementations, the identified conversation assistance resource is another user with similar interests, information, preferences, etc. as the user needing assistance. The user and the identified conversation assistance resource may be connected in a communication session using a communication channel (e.g., text message, social media message, Skype message, WhatsApp message). The user and the identified conversation assistance resource are able to converse regarding recommendations. Because the user and the identified conversation assistance resource are connected based on the predicted user, relatable user profiles, and because the resource is interactive (e.g., conversational), the user may trust any recommendations provided by the conversation assistance resource better than a static information on a website.

Information collected about a user, a user's actions, preferences, etc. for generating and augmenting a user profile and for predicting user needs may be in the form of user signals. User signals may be collected by an application or process on the user's device. An example application includes, for example, an intelligent personal assistant such as Microsoft Cortana, Google Now, Google Home, Apple Siri, or Amazon Echo. Such applications may monitor other feeds from other applications to detect preferences, upcoming trips, etc. Such applications may further monitor device parameters such as current location, time, etc. The information (as user signals) may be intermittently sent to cloud-based services that manage user profiles that may be stored in a user profile database. The conversation assistance resource system described herein may be part of the cloud-based service or interact with the cloud-based service. As such, user need scenarios for different need domains may be configured as part of the conversation assistance resource system. The conversation assistance resource system is configured to listen (e.g., monitor) for certain user signals that may trigger a need scenario in one or more need domains. If a need scenario is triggered based on a user signal, then the need may be predicted (e.g., based on other information), the user notified, and a resource identified dependent on subsequent actions (e.g., confirmation by the user and/or identified resource).

Because user information, actions, behaviors, preferences, are automatically captured by the conversation assistance resource system, a need is predicted for the user without any subsequent (or very little) action on the part of the user. After the need is predicted, any potential resources are identified and the user is notified that resources may be available to the user. Thus, the user is provided with a passive but positive experience in finding information about a need that was predicted based on user actions. Furthermore, the user may be provided a resource in one domain and may act as a resource in another domain, which provides a desirable community aspect as users assist other users.

Figure 1:
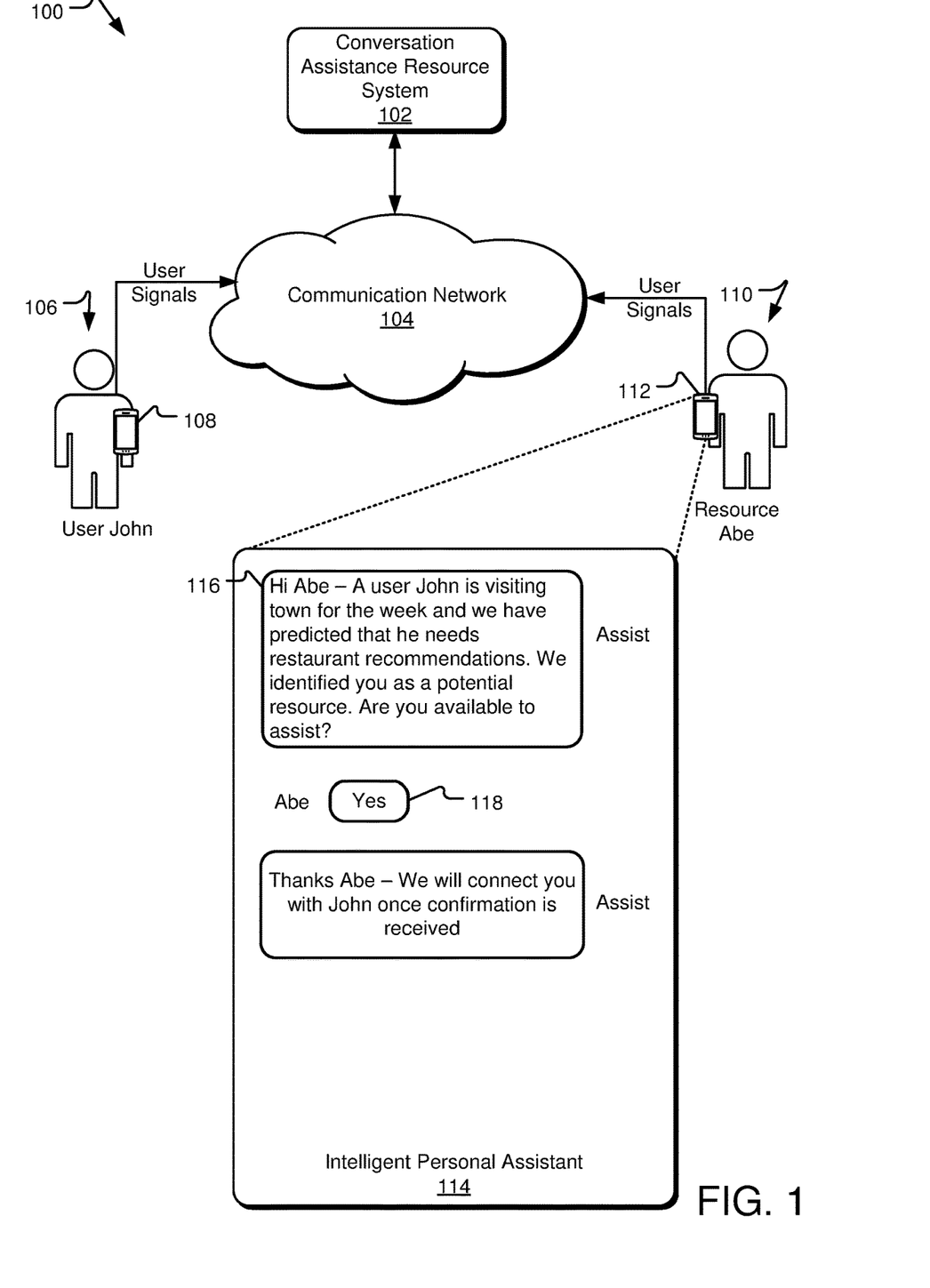
FIGS. 1-3 illustrate an example system for matching a user with a resource based on a predicted user need.

FIG. 1 illustrates an example system 100 for matching a user with a resource based on a predicted user need. The system 100 includes a conversation assistance resource system 102, a communication network 104, a user 106 with a device 108 and a resource 110 with a device 112. The devices 108 and 112 may be a smart phone, tablet, phablet, laptop computer, desktop computer, gaming device, etc. The devices 108 and 112 may include software and hardware for facilitating communications to other devices, networks, etc. over the communication network 104. The communication network 104 may include a number of elements for facilitating wired and/or wireless communication over one or more communication protocols including 3G, 4G, long-term evolution (LTE), Wi-Fi, Near Field Communication (NFC), Bluetooth, Global Positioning System (GPS), and other communication protocols and protocol elements. The conversation assistance resource system 102 may be a cloud-based service that communicates with one or more devices (such as the devices 108 and 112) over the communication network 104.

The user 106 and the resource 110 may regularly utilize an intelligent personal assistant 114 executing on their respective devices 108 and 112. The intelligent personal assistant 114 may be an interactive conversation service such as a bot and may include Microsoft Cortana, Apple Siri, Google Now, Google Home, Amazon Echo, etc. The intelligent personal assistant 114 executes on the device 108 but may be operated by one or more cloud-based services including the conversation assistance resource system 102. The intelligent personal assistant 114 (or the cloud service) collects user signals from the resource 110 and an intelligent personal assistant executing on the device 108 of the user 106 collects user signals from the user 106. User signals may include any input such as text input, preferences, and behavior. The collected user signals are utilized to build a profile for the user 106 and the resource 110 and associate the respective profiles to the user 106 (e.g., the device 108) and the resource 110 (e.g., the device 112). In some example implementations, the user 106 and the resource 110 voluntarily submit information to the intelligent personal assistant 114 for profile management. For example, the profile associated with the resource 110 (hereinafter "resource profile") includes information about the resource 110 such as the resource's career, age, gender, food preferences, music/TV/entertainment preferences, major hub (e.g., office/home), places of interest visited in the past, games, news subscriptions, sports preferences, shopping preferences, events visited in the past, communication contacts, etc. Such information may be manually entered by the resource 110 or inferred by the intelligent personal assistant 114. Furthermore, the intelligent personal assistant 114 may have access to features on the device such as downloaded applications, social network feeds/friends/preferences, location information, contacts, email, calendars, etc. to gather such information to build a robust profile.

Similarly, the user 106 may utilize and execute, on the device 112, an intelligent personal assistant application. The intelligent personal assistant application executing on the device 108 of the user 106 may similarly collect, gather, and receive resource signals to build a profile for the user 106 (hereinafter "user profile").

The conversation assistance resource system 102 may monitor, via the intelligent personal assistant executing on the device 108 of the user 106, one or more user signals to predict situations where the user 106 may need a recommendation or assistance. Such situations are referred to as "predicted user needs." For example, signals received from the intelligent personal assistant 114 may include information describing upcoming flights, upcoming events, upcoming special dates (e.g., birthday, holiday, wedding), etc. The signals may describe how the user 106 is playing a new game, moves/moving to a new employer, user changes his/her dietary preferences, or is in a shopping area such as a mall. As described above, such information may be collected manually from the user, inferred by the intelligent personal assistant 114 and/or the conversation assistance resource system 102, collected from other applications or services executing on the device 108, and may be sent to the conversation assistance resource system 102 as a user signal.

In FIG. 1, the conversation assistance resource system 102 and/or the intelligent personal assistant 114 detects that the user 106 ("John") is in a new city. Such detection may be based on location information, a query entered into a search service looking for hotels/restaurants in the new city, a travel itinerary detected in an email/calendar application, etc. In response, the conversation assistance resource system 102 performs a number of operations to identify a conversation assistance resource (e.g., the resource 110) to assist the user 106 with the predicted need. After the resource 110 is identified, the intelligent personal assistant 114 initiates a conversation with the resource 110 to confirm the availability of the resource 110. A first query 116 to the resource 110 notes that the resource 110 has been identified as being a potential resource for the user 106. After the resource 110 confirms availability in a response 118, the conversation assistance resource system 102 confirms with the user 106 that the user 106 wishes to be connected to Abe (illustrated in FIG. 2). If the user 106 confirms that he would like to be connected to the resource 110, then the conversation assistance resource system 102 establishes a communication channel between the user 106 and the resource 110.

The operations performed by the conversation assistance resource system 102 to identify the resource 110 may include identifying one or more resources in the located in or near the city of the predicted need, filtering the identified resources based on the type of need, etc. Further operations may include using machine learning and pattern matching techniques to match the interests, preferences, etc. included in the user profile associated with the user 106 with the interests, preferences, etc. included in the resource profiles (e.g., user profiles) associated with one or more resources. Such techniques may be utilized to identify one or more resources with similar dietary/food preferences, occupations, ages within ranges, etc. as the user 106. In other words, matchmaking techniques are used to identify one or more resources (users) that are relevant to the user 106.

In some example implementations, certain information about the user 106 and the resource 110 may be withheld from the other party for privacy purposes. For example, a first name, an alias, etc. may be used to identify the other party. The parties may choose to share more detailed information to maintain connection.

Figure 2:
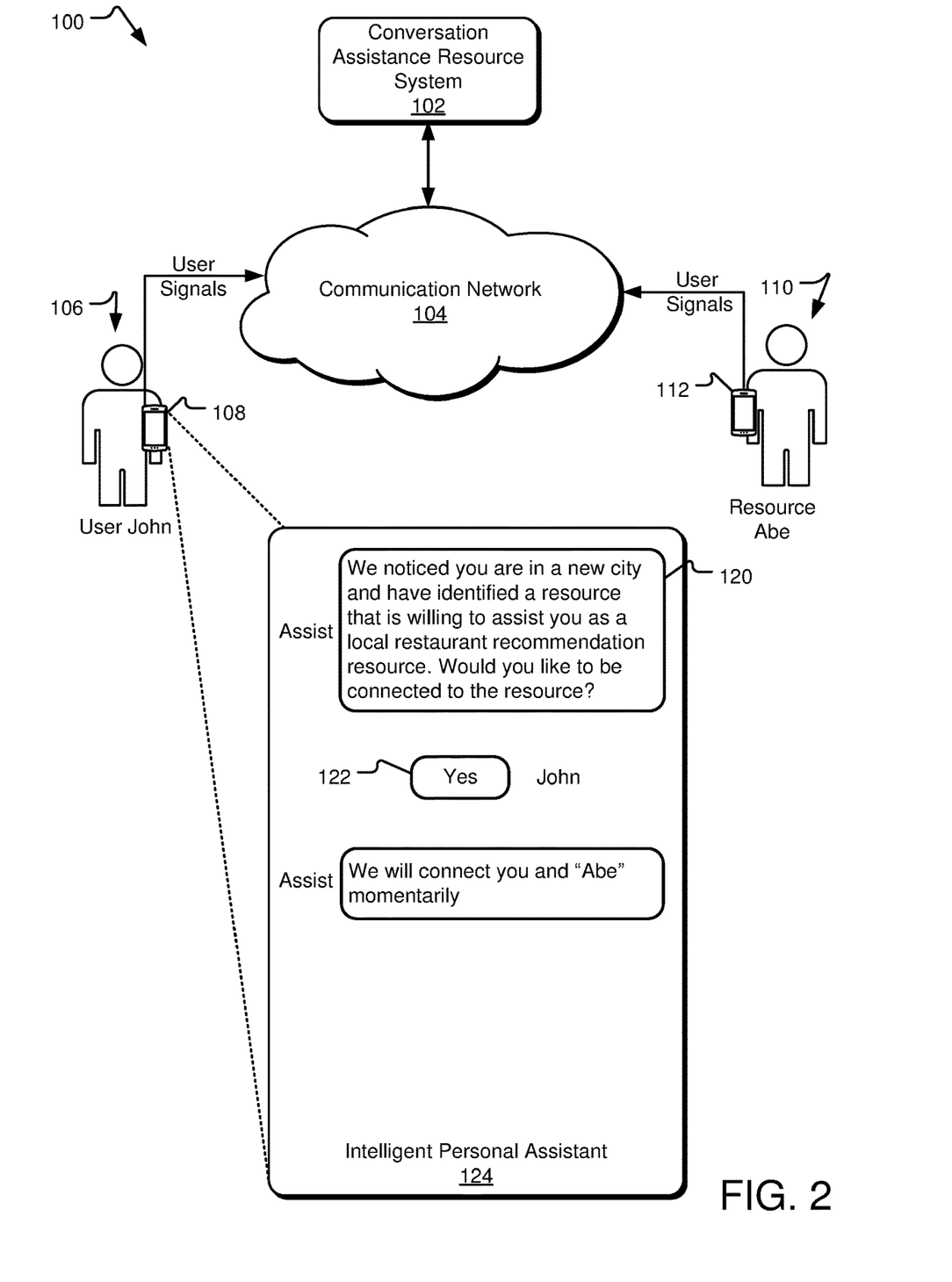
Figure 3:
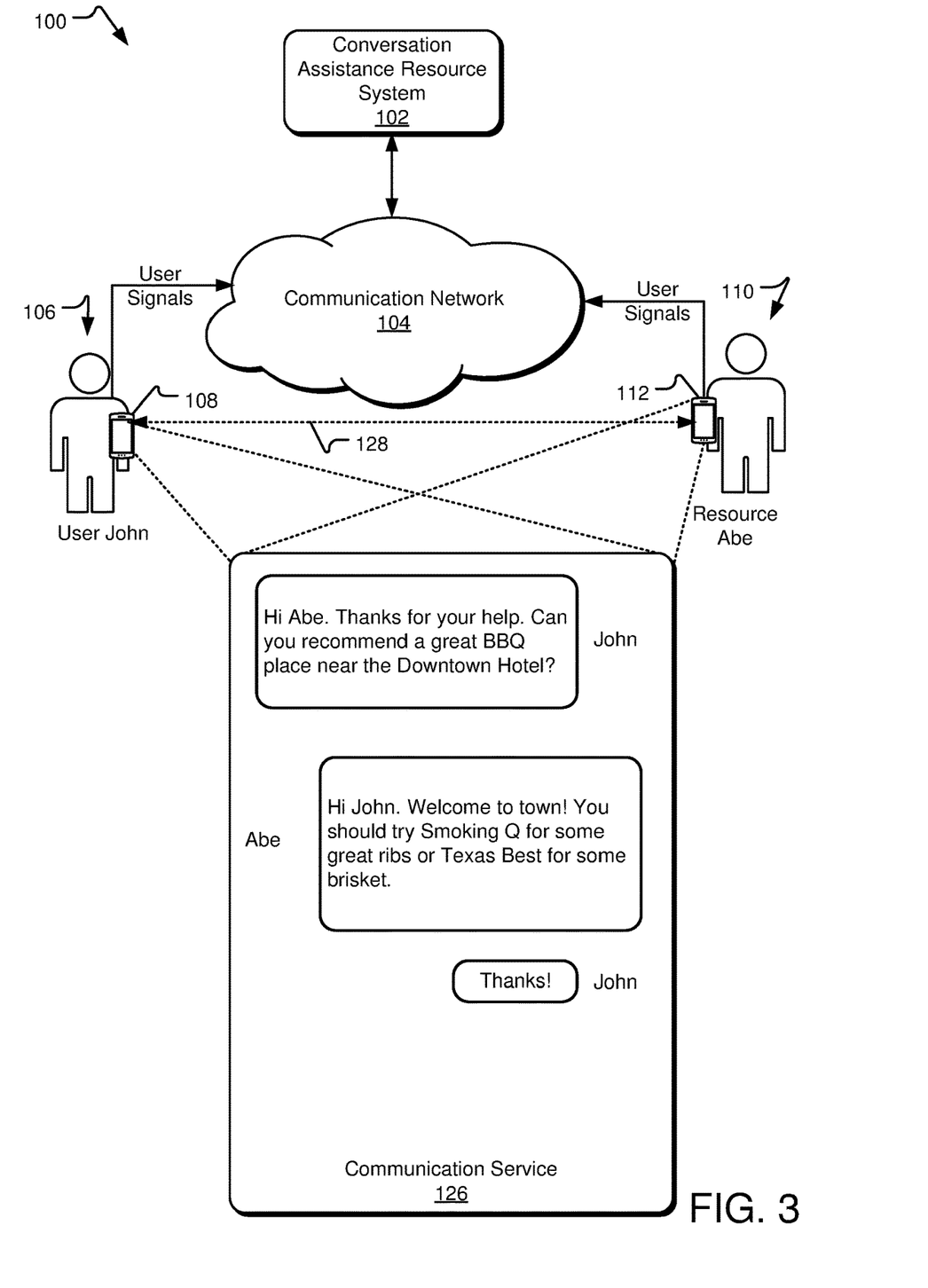

Predicted needs may be based on a number of need scenario domains. The example illustrated in FIGS. 1-3 is a user in a new city domain. Other domains include user is browsing the web and contemplating purchasing a new product, such as a mountain bike. This is an example need scenario in a product domain. In such an example, the user may be connected to other users (resources) with experience (e.g., information in the user profile indicating) in purchasing mountain bikes. Other need scenario domains include places of interest domains based on online web browsing. For example, if a user is browsing the web for golf courses in a particular location, then the user may be connected to another user that has played a significant number of courses in the area.

In some example implementations, the identified resource is an interactive conversation service such as a chat bot, service bot, etc. Such bots may be customized for particular purposes. For example, a bot provided by Hipmunk, which interfaces with Skype, among other services, is usable to book flights and hotels. As such, if a user is detected querying flights, then a user need is predicted for a user (e.g., travel booking need) and the Hipmunk bot may be identified as a conversation assistance resource. The user may be connected to the Hipmunk bot via skype.

FIG. 2 continues the illustration of FIG. 1 for matching a user with a resource based on a predicted user need. The system 100 includes the conversation assistance resource system 102, the communication network 104, the user 106 with the device 108 and the resource 110 with the device 112.

The user 106 and the resource 110 may regularly utilize an intelligent personal assistant 124 executing on their respective devices 108 and 112 (e.g., the intelligent personal assistant 124 is executing on the device 108 of the user 106). The intelligent personal assistant 124 may be an interactive conversation service such as a bot and may include Microsoft Cortana, Apple Siri, Google Now, Amazon Echo, etc. The intelligent personal assistant 124 executes on the device 112 but may be backed by one or more cloud-based services including the conversation assistance resource system 102. The intelligent personal assistant 124 (or the cloud service) collects user signals from the user 106 (e.g., via the device 108). User signals may include any input such as text input, preferences, and behavior. The collected user signals are utilized to build a profile for the user 106 and associate the profile to the user 106 or the device 108. In some example implementations, the user 106 and the resource 110 voluntarily submit information to the intelligent personal assistant 124 for profile management.

As illustrated in FIG. 2, the resource 110 ("Abe") is identified as a "local restaurant recommendation resource." The query 120 notifies the user 106 that he is recognized as being in a new city and asks the user 106 if he would like to be connected to an identified local restaurant recommendation resource (e.g., the resource 110). A response 122 notifies the intelligent personal assistant 124 and the conversation assistance resource system 102 that the user 106 would like to be connected to Abe, the resource 110. In response, the conversation assistance resource system 102 (e.g., via the intelligent personal assistant 114 and 124) establishes a communication channel between the user 106 and the resource 110. The communication channel may be a text message, social network message, an instant messaging application such as Skype, Slack, WhatsApp, a phone call, video call, etc. The communication channel may be established based on user preferences, resource preferences, previously used communication channels, etc. In some implementations, if one or both parties do not have an application supporting a communication channel, the parties may be prompted to download an application or sign up/log in to a web application.

It should be understood that other methods of receiving confirmation from the user 106 and/or the resource 110 are contemplated. For example, a user may opt in to a resource recommendation using a button displayed on the device 108, replying to an email notification, etc. Furthermore, potential resources, such as the resource 110, may opt in to being a resource based on a number of scenarios. For example, the conversation assistance resource system 102 may identify the resource 110 as being a potential resource in one or more resource domains such as restaurant recommendations in a particular location or local places of interest. After the resource is identified, the conversation assistance resource system 102 may query the resource 110 (e.g., via email or an intelligent personal assistant) to determine if the resource 110 would like to be utilized as a resource. In some example implementations, the resource 110 may select resource domains using a dashboard, user interface etc. provided by the conversation assistance resource system 102.

FIG. 3 continues the example of FIGS. 1 and 2 for matching a user with a resource based on a predicted user need. The system 100 includes the conversation assistance resource system 102, the communication network 104, the user 106 with the device 108 and the resource 110 with a device 112.

The conversation assistance resource system 102 and/or the intelligent personal assistant (not shown) identified a predicted user need for the user 106 ("John") based on the John being in a new city. The prediction for the user need was based on John's location in the new city, a detected travel itinerary, a query, etc. Based on the predicted user need and respective profiles associated with the user 106 and the resource 110, Abe (the resource 110), was identified as a resource that could assist the user 106. After confirming with the resource 110 that the resource 110 is available to assist the user 106, The intelligent personal assistant queried John (over a first communication channel such as the intelligent personal assistant 124 channel) to ask if he would like to be connected to a restaurant recommendation resource. After John and Abe confirmed, the conversation assistance resource system 102 establishes a third communication channel 128 between the user 106 and the resource 110. The communication channel 128 may be established via text message, phone call, video call, social network, etc. In the illustrated implementation, the third communication channel 128 is established over a communication service 126. In some example implementations, the communication service 126 is an application executing on one or both of the devices 108 and 112 and may be a web-application accessible through a browser on one or both of the devices 108 and 112.

Using the established third communication channel 128, the user 106 and the resource 110 are able to communicate. As illustrated, the user 106 ("John") asks the resource 110 ("Abe") whether Abe can recommend any barbeque ("BBQ") restaurants near the Downtown Hotel. Abe gives a couple recommendations. As illustrated, only the first names of each party are disclosed to the other party for privacy reasons. In some implementations, the names are hidden. Each party may choose to divulge additional information. In some implementations, after the communications through the third communication channel 128 have stopped, the third communication channel 128 is closed, and the parties may be disconnected for privacy purposes.

In some example implementations, the intelligent personal assistant 114 and 124 (e.g., Cortana) monitors the conversation between the user 106 and the resource 110 and is able to further assist the user 106 and/or the resource 110. The intelligent personal assistant 114 and 124 may generate, based on the conversation, one or more user signals associated with the user 106 and/or the resource 110 to be sent to the conversation assistance resource system 102. The conversation assistance resource system 102 may augment one or more profiles associated with the user 106 and/or the resource 110 based on the user signals. Furthermore, a user need may be predicted for the user 106 and/or the resource 110 based on the received user signals.

Further, in some example implementations, each of the parties may be provided an opportunity to rate the other party. For example, after the user 106 ends the communication session with the resource 110, the user may be queried, by the intelligent personal assistant 124, email, etc., to provide a rating for the resource 110. The resource 110 may be similarly queried to provide a rating for the user 106. The ratings may be sent to the conversation assistance resource system 102 and incorporated as part of the profiles for the user 106 and/or the resource 110.

Figure 4:
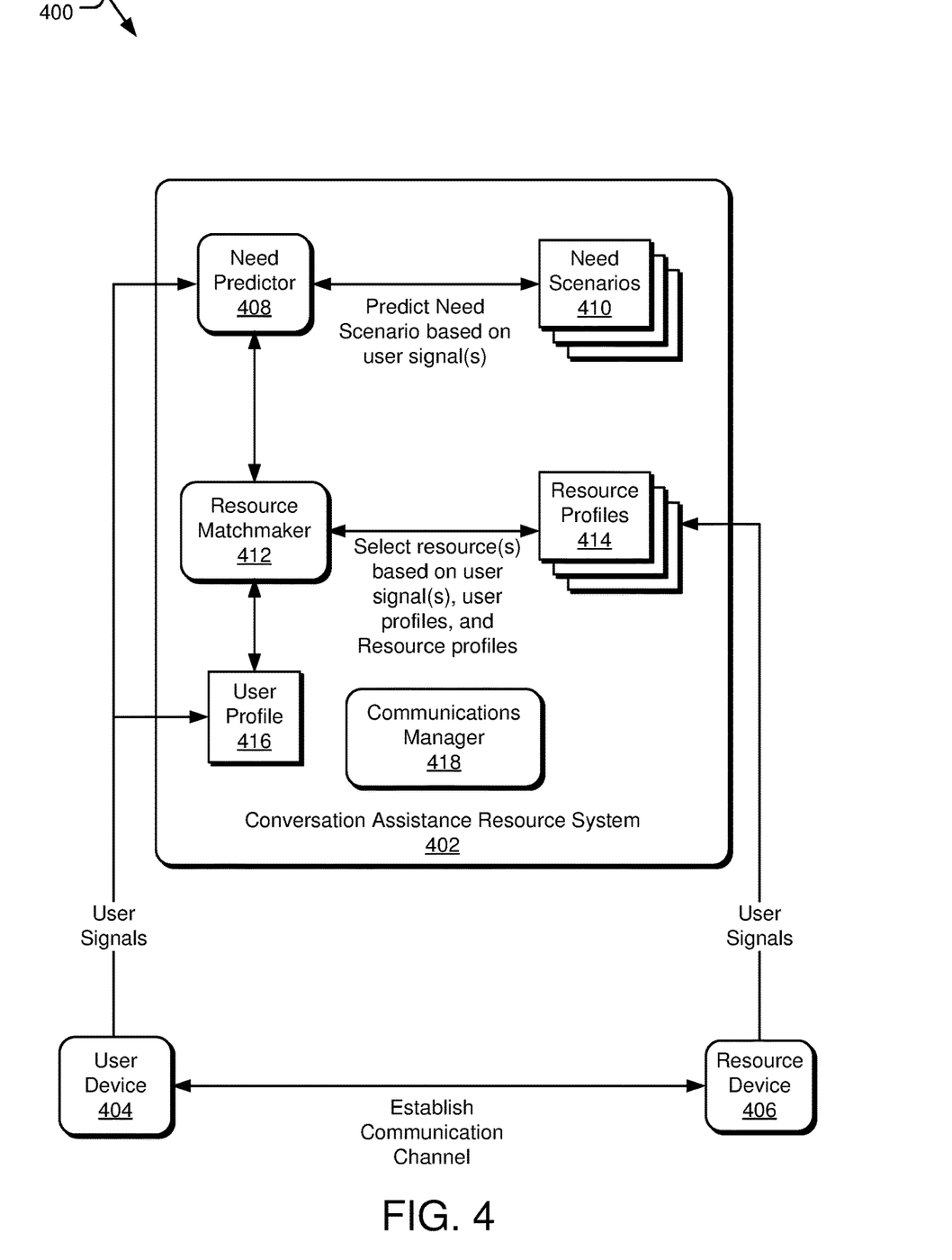
FIG. 4 illustrates a block diagram of an example system for matching a user with a resource based on a predicted user need.

FIG. 4 illustrates a block diagram of an example system 400 for matching a user with a resource based on a predicted user need. The system 400 includes a conversation assistance resource system 402. The conversation assistance resource system 402 may be cloud-based system configured to communicate over a communication network (not shown) with a number of user devices such as a user device 404 and a resource device 406. The user device 404 and the resource device 406 may collect behavioral information, preferences, actions, etc. using an intelligent personal assistant executing on the user devices 404 and the resource device 406. Such collected information may be utilized to build and augment user profiles such as a user profile 416.

The conversation assistance resource system 402 includes a need predictor 408. The need predictor 408 monitors received user signals to determine to potential needs. The need predictor 408 is configured to monitor triggers for a number of potential need scenarios 410. The need scenarios may include scenarios such as in a new city, new product purchase, new product browsing session, etc. For example, in the new city scenario, the user may need museum, restaurant, event, etc. recommendations. Such needs may be thought of as sub scenarios of the new city scenario. The new city scenario may be triggered by one or more user signals such as a detected upcoming flight, the user is in a new location, etc. Once the scenario is triggered, the need predictor 408 may analyze a profile associated with the user to predict possible needs for the user. For example, if the profile is associated with the user indicates that the user likes to visit museums (e.g., based on previous visits, activities, etc.), then a museum recommendation need may be predicted for the user (e.g., as a subset of the new city scenario).

If the user is detected as browsing the internet or querying for new vehicles such as SUVs, then a user signal with such information may be detected by the need predictor 408. The need predictor may utilize the user signal to predict that the user may need a resource to help with providing information regarding certain SUVs. In another example, if it is detected that the user purchased a new camera (e.g., based on a user signal detected), then the need predictor 408 may predict that the user needs assistance in learning how to use the camera.

A predicted user need is communicated to a resource matchmaker 412 of the conversation assistance resource system 402. The resource matchmaker 412 performs a number of operations to match the user profile 416 with one or more resource profiles 414. In the museum recommendation scenario described above, the resource matchmaker 412 may determine the location of the user and filter resource profiles from the resource profiles 414 that are not in or near the city. The resource matchmaker 412 may then compare the user profile 416 to the remaining resource profiles 414 using machine learning techniques to identify one or more resource profiles 414 associated with a resource that may be able to assist the user with museum recommendations. Such techniques may be utilized to identify the one or more resource profiles that have similar characteristics such as similar occupations, interests, age range, etc. In some example implementations, identified profiles meet an assisting condition before such resources associated with the profiles are suggested to the users. The assisting condition may be based on the predicted need, and/or a number of matching profile parameters such as age, gender, occupation, etc.

Returning to the SUV searching example described above, the need predictor 408 predicts that the user needs an SUV resource. The resource matchmaker 412 may analyze the user profile 416 to determine that the user currently drives a Subaru. The resource matchmaker 412 may select one or more resource profiles 414 of potential resources that drive Subaru SUVs to recommend to the user. Returning to the camera purchasing example, the need predictor 408 predicts that the user needs a camera resource. The resource matchmaker 412 may select potential resources that have recently purchased the same model camera. Other matchmaking techniques are contemplated.

After the need is predicted by the need predictor 408 and the one or more potential resources are identified by the resource matchmaker 412, a communications manager 418 of the conversation assistance resource system 402 communicates with the one or more identified resources via a first communication channel to acquire confirmation from the one or more resources that the one or more resources are available to assist the user with the predicted user need. The communication channel may be established using a communications application, an intelligent personal assistant, email, etc. The communications manager 418 further communicates with the user via a second communication channel to acquire confirmation from the user that the user is willing to be connected to the identified conversation assistance resource. If confirmation is received from the user and one or more identified conversation assistance resources, the communications manager 418 establishes a third communication channel between the user and the one or more confirmed conversation assistance resources. The third communication channel may be established via a web application, social media, conversation application such as Skype or Slack, etc.

In some example implementations, the resource matchmaker 412 may perform load balancing procedures such that a user is not identified as a resource too many times in a period. For example, the user (e.g., potential resource) may elect to be a resource twice in a week. If the user is utilized as a resource twice in one week, then the user will not be selected as a resource again until the next week. In some implementations, the resource matchmaker 412 automatically load balances depending on the number of potential resources in an area, number of predicted user needs, etc.

Figure 5:
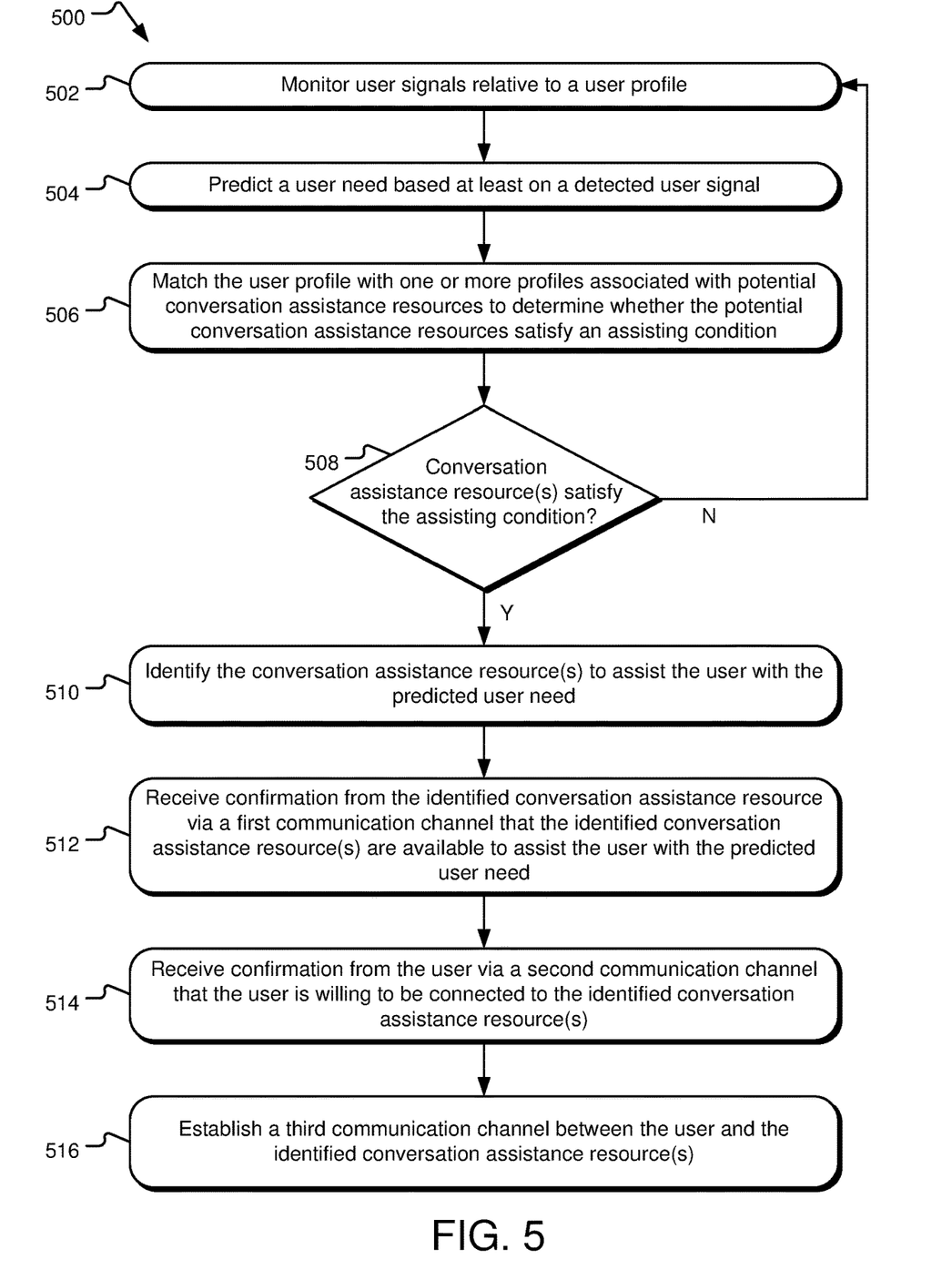
FIG. 5 illustrates example operations for matching a user with a resource for a predicted user need

FIG. 5 illustrates example operations 500 for matching a user with a resource for a predicted user need. A monitoring operation 502 monitors user signals relative to a user profile. The user profile may be based on previously received user signals, user preferences, etc. The monitoring operation 502 may be based on one or more need scenarios. For example, in the new scenario described above, the monitoring operation 502 monitors user signals with information regarding a user being a new city. Such information may include a travel itinerary (e.g., flights or hotel reservation), detected location in a new city, etc. A predicting operation 504 predicts a user need based at least on a detected user signal. A matching operation 506 matches the user profile with one or more profile associated with potential conversation assistance resources to determine whether the potential conversation assistance resources satisfy an assisting condition. The matching operation 506 may use filtering techniques to filter some profiles associated with potential conversation assistance resources. Furthermore, the matching operation 506 may include matchmaking techniques to compare interests, behaviors, preferences, etc. in the user profile with interests, behaviors, preferences, etc. of one or more profiles associated with potential conversation assistance resources.

A determining operation 508 determines whether any potential conversation assistance resources satisfy the assisting condition. The assisting condition may be based on a similarity of interests, behaviors, preferences, age, gender, current locations, etc. The assisting condition may be a similarity threshold, the top number of similar profiles (e.g., top three profiles that best match with the user profile), etc. If conversation assistance resources do not satisfy the assisting condition, one or more other profiles may be tested, the user may be notified that no resources are able to help, etc., and the process returns to the monitoring operation 502. If the conversation assistance resource does satisfy the assisting condition, an identifying operation 510 identifies the conversation assistance resources to assist the user with the predicted user need.

A receiving operation 512 receives confirmation from the identified conversation assistance resource via a first communication channel that the identified conversation assistance resource(s) are available to assist the user with the predicted user need. A receiving operation 514 receives confirmation from the user via a second communication channel that the user is willing to be connected to the identified conversation assistance resource(s). Responsive to the received confirmation is in the receiving operation 512 and the receiving operation 514, an establishing operation 516 establishes a third communication channel between the user and the identified conversation assistance resource.

Figure 6:
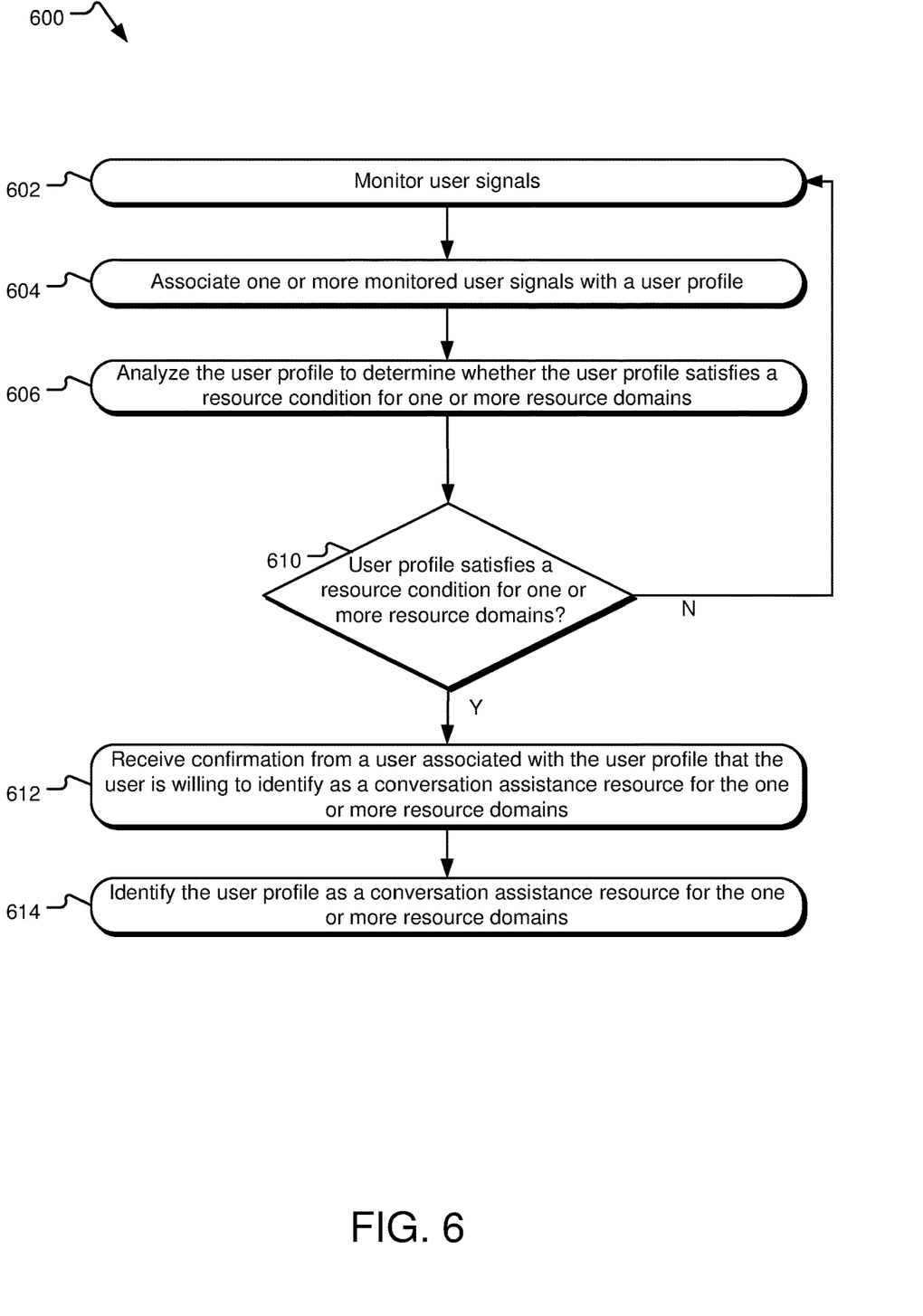
FIG. 6 illustrates example operations for building a user profile and identifying a user associated with the user profile as a resource

FIG. 6 illustrates example operations 600 for building a user profile and identifying user associated with the user profile as a resource. The operations 600 may be similarly used to generate a user profile associated with a user for which a need may be predicted. A monitoring operation 602 monitors user signals received from one or more user devices. The user signals may indicate information about a user such as age, major hub location (e.g., office/home), occupation, employer, food preferences, dietary preferences, entertainment preferences (e.g., music, TV, movies), places of interest visited in the past, games, news subscriptions, shopping preferences, sports preferences, events visited in the past, social media feeds, contacts, etc. Such information may be inferred by an intelligent personal assistant executing on the one or more devices or manually entered by the user. An associating operation 604 associates the monitored signals with a user profile. An analyzing operation 606 analyzes a user profile to determine whether the user profile satisfies a resource condition for one or more resource domains. A determining operation 610 determines whether the user profile satisfies a resource condition for one or more resource domain. The determining operation 610 may include finding domains for which the user has a significant number of signals. For example, if user signals received indicate that the user eats out frequently in a certain city (e.g., via queries, locations, reviews), then such a user may be flagged as a potential resource in dining in the city. Similarly, if a user frequents museums, then the user may be flagged as a resource for museums. In another example, if the user purchased a product, then the user may be flagged as a resource for that product. Other resource domains are contemplated such as, for example, music resource, entertainment resource, activity resource (e.g., golf, hiking), event resource, news resource, social media feed resource, sports resource, etc. If the user profile does not satisfy a resource condition for one or more resource domains the process returns to the monitoring operation 602.

If the user profile satisfies a resource condition for one or more resource domains, then a receiving operation 612 receives confirmation from a user associated with the user profile that the user is willing to identify as a resource for the one or more domains. An identifying operation 614 identifies the user profile as a resource for the one or more resource domains (e.g., those that satisfy the resource condition). The identifying operation 614 may flag the profile as a resource for the one or more domains. The domains may be associated with the current location of the user. Now that the user is identified as a resource, if another user needs the resource (e.g., based on a predicted need) in one of the domains, then the resource may be included in a matchmaking process that may identify the resource as a resource for the user need.

Figure 7:
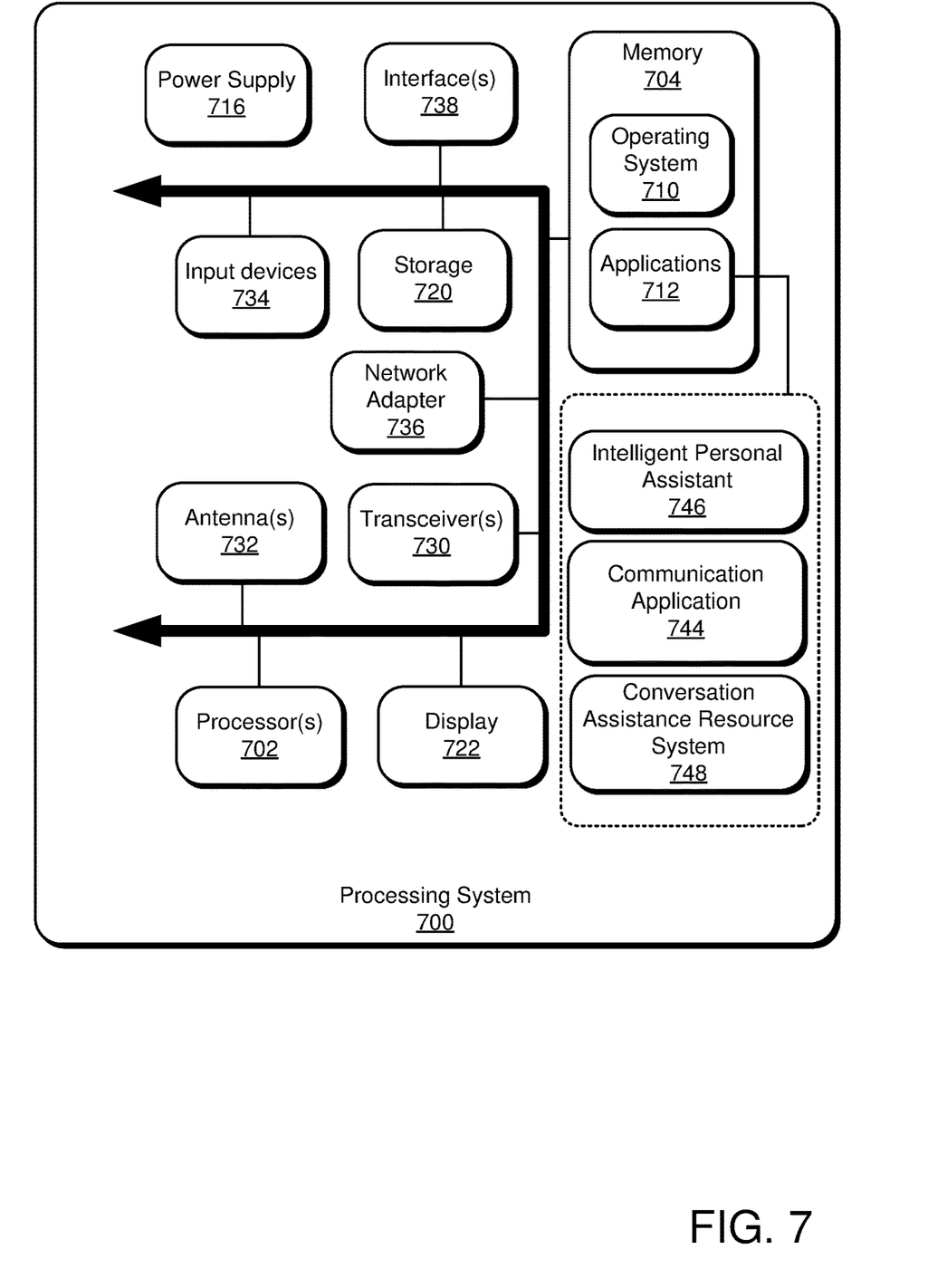
FIG. 7 illustrates an example system that may be useful in implementing the described technology.

FIG. 7 illustrates an example system (labeled as a processing system 700) that may be useful in implementing the described technology. The processing system 700 may be a client device such as a laptop, mobile device, desktop, tablet, or a server/cloud device. The processing system 700 includes one or more processor(s) 702, and a memory 704. The memory 704 generally includes both volatile memory (e.g., RAM) and non-volatile memory (e.g., flash memory). An operating system 710 resides in the memory 704 and is executed by the processor 702.

One or more application programs 712 modules or segments, such as an intelligent personal assistant 746, a communication application 744, or a conversation assistance resource system 748 are loaded in the memory 704 and/or storage 720 and executed by the processor 702. The conversation assistance resource system 748 may include sub-application programs, modules, or segments such as a communications manager, a matchmaking service, a user need predictor, etc. Data such user signals, user profiles, resource domains, resource scenarios, assisting conditions, resource conditions, user preferences, etc. may be stored in the memory 704 or storage 720 and may be retrievable by the processor 702 for use in the by the intelligent personal assistant 746, the communication application 744, or the conversation assistance resource system 748, etc. The storage 720 may be local to the processing system 700 or may be remote and communicatively connected to the processing system 700 and may include another server. The storage 720 may store resources that are requestable by client devices (not shown).

The processing system 700 includes a power supply 716, which is powered by one or more batteries or other power sources and which provides power to other components of the processing system 700. The power supply 716 may also be connected to an external power source that overrides or recharges the built-in batteries or other power sources.

The processing system 700 may include one or more communication transceivers 730 which may be connected to one or more antenna(s) 732 to provide network connectivity (e.g., mobile phone network, Wi-Fi®, Bluetooth®, etc.) to one or more other servers and/or client devices (e.g., mobile devices, desktop computers, or laptop computers). The processing system 700 may further include a network adapter 736, which is a type of communication device. The processing system 700 may use the network adapter 736 and any other types of communication devices for establishing connections over a wide-area network (WAN) or local-area network (LAN). It should be appreciated that the network connections shown are exemplary and that other communications devices and means for establishing a communications link between the processing system 700 and other devices may be used.

The processing system 700 may include one or more input devices 734 such that a user may enter commands and information (e.g., a keyboard or mouse). These and other input devices may be coupled to the server by one or more interfaces 738 such as a serial port interface, parallel port, universal serial bus (USB), etc. The processing system 700 may further include a display 722 such as a touch screen display.

The processing system 700 may include a variety of tangible processor-readable storage media and intangible processor-readable communication signals. Tangible processor-readable storage can be embodied by any available media that can be accessed by the processing system 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 700. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example system includes a user need predictor configured to predict a user need of a user associated with a user profile, the prediction based on a user signal of one or more user signals associated with the user profile; a matchmaking service configured to identify at least one conversation assistance resource based on the predicted user need and a matching of the user profile with one or more profiles associated with potential conversation assistance resources; and a communications manager configured to establish a communication channel between the user and the identified at least one conversation assistance resource responsive to identification of the at least one conversation assistance resource.

Another example system of any preceding system further includes the matchmaking service being further configured to match the user profile with one or more profiles associated with potential conversation assistance resources to determine whether the at least one conversation assistance resource satisfies an assisting condition, satisfaction of the assisting condition qualifying the at least one conversation assistance resource to assist the user with the predicted user need.

Another example system of any preceding system further includes the communications manager being figure configured to receive confirmation from the identified at least one conversation assistance resource that the at least one conversation assistance resource is available to assist the user with the predicted user need; and receive confirmation from the user that the user is willing to be connected to the at least one conversation assistance resource.

Another example system of any preceding system further includes the one or more profiles associated with the potential conversation assistance resources being selected based on the predicted user need.

Another example system of any preceding system further includes the predicted user need being predicted based on one or more user need scenarios.

Another example system of any preceding system further includes the identified at least one conversation assistance resource being an interactive conversation service.

Another example system of any preceding system further includes the identified at least one conversation assistance resource being associated with a profile, the profile being based at least one or more user signals associated with the conversation assistance resource.

An example method includes predicting a user need of a user associated with a user profile, the prediction based on a user signal of one or more user signals associated with the user profile, the user profile being stored in a user profile database; predicting a user need of a user associated with a user profile, the prediction based on a user signal of one or more user signals associated with the user profile, the user profile being stored in a user profile database; identifying at least one conversation assistance resource responsive to a profile associated with the identified at least one conversation assistance resource satisfying the assisting condition, satisfaction of the assisting condition qualifying the at least one conversation assistance resource to assist the user with the predicted user need; receiving confirmation from the identified at least one conversation assistance resource via a first communication channel that the at least one conversation assistance resource is available to assist the user with the predicted user need; receiving confirmation from the user via a second communication channel that the user is willing to be connected to the at least one conversation assistance resource; and establishing a third communication channel between the user and the identified at least one conversation assistance resource responsive to receiving confirmation from the user and the identified at least one conversation assistance resource.

Another example method of any preceding method further includes the predicted user need being predicted based on one or more user need scenarios.

Another example method of any preceding method further includes the one or more user signals being associated with monitored user actions.

Another example method of any preceding method further includes the identified at least conversation assistance resource being another user, the profile associated with the at least one conversation assistance resource being a user profile associated with the another user.

Another example method of any preceding method further includes the identified at least one conversation assistance resource being an interactive conversation service.

Another example method of any preceding method further includes the identified at least one conversation assistance resource is associated with a profile, the profile being based at least one or more user signals associated with the conversation assistance resource.

An example one or more tangible processor-readable storage media embodied with instructions for executing on one or more processors and circuits of a device a process includes predicting a user need of a user associated with a user profile, the prediction based on a user signal of one or more user signals associated with the user profile; identifying at least one conversation assistance resource based on the predicted user need and a matching of the user profile with one or more profiles associated with potential conversation assistance resources to determine whether the at least one conversation assistance resource satisfies an assisting condition, satisfaction of the assisting condition qualifying the at least one conversation assistance resource to assist the user with the predicted user need; and establishing a communication channel between the user and the identified conversation assistance resource responsive to determining that the at least one conversation assistance resource satisfies the assisting condition.

Another example process of any preceding process further includes receiving confirmation from the identified at least one conversation assistance resource that the at least one conversation assistance resource is available to assist the user with the predicted user need; and receiving confirmation from the user that the user is willing to be connected to the at least one conversation assistance resource.

Another example process of any preceding process further includes the one or more user profiles associated with the potential conversation assistance resources being selected based on the predicted user need.

Another example process of any preceding process further includes the predicted user need being predicted based on one or more user need scenarios.

Another example process of any preceding process further includes the one or more user signals being associated with monitored user actions.

Another example process of any preceding process further includes the identified at least conversation assistance resource being another user, the profile associated with the at least one conversation assistance resource being a user profile associated with the another user.

Another example process of any preceding process further includes the identified at least one conversation assistance resource is associated with a profile, the profile being based at least one or more user signals associated with the conversation assistance resource.

An example system includes means for predicting a user need of a user associated with a user profile, the prediction based on a user signal of one or more user signals associated with the user profile, the user profile being stored in a user profile database; predicting a user need of a user associated with a user profile, the prediction based on a user signal of one or more user signals associated with the user profile, the user profile being stored in a user profile database; identifying at least one conversation assistance resource responsive to a profile associated with the identified at least one conversation assistance resource satisfying the assisting condition, satisfaction of the assisting condition qualifying the at least one conversation assistance resource to assist the user with the predicted user need; receiving confirmation from the identified at least one conversation assistance resource via a first communication channel that the at least one conversation assistance resource is available to assist the user with the predicted user need; receiving confirmation from the user via a second communication channel that the user is willing to be connected to the at least one conversation assistance resource; and establishing a third communication channel between the user and the identified at least one conversation assistance resource responsive to receiving confirmation from the user and the identified at least one conversation assistance resource.

Another example system of any preceding system further includes means for the predicted user need being predicted based on one or more user need scenarios.

Another example system of any preceding system further includes means for the one or more user signals being associated with monitored user actions.

Another example system of any preceding system further includes means for the identified at least conversation assistance resource being another user, the profile associated with the at least one conversation assistance resource being a user profile associated with the another user.

Another example system of any preceding system further includes means for the identified at least one conversation assistance resource being an interactive conversation service.

Another example system of any preceding system further includes means for the identified at least one conversation assistance resource is associated with a profile, the profile being based at least one or more user signals associated with the conversation assistance resource.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
a user need predictor configured to predict a user need of a user having a user profile, the prediction based on a user signal of one or more user signals and the user profile;
a matchmaking service configured to identify at least one conversation assistance resource based on the predicted user need and a matching of the user profile with one or more profiles associated with potential conversation assistance resources; and
a communications manager configured to:
request and receive confirmation from the identified at least one conversation assistance resource via a first communication channel indicating that the at least one conversation assistance resource is available to assist the user with the predicted user need;
request and receive confirmation from the user via a second communication channel that the user is willing to be connected to the at least one conversation assistance resource; and
establish a third communication channel between the user and the identified at least one conversation assistance resource responsive to receiving confirmation from the user and the identified at least one conversation assistance resource.

2. The system of claim 1 wherein the matchmaking service is further configured to:
match the user profile with one or more profiles associated with potential conversation assistance resources to determine whether the at least one conversation assistance resource satisfies an assisting condition, satisfaction of the assisting condition qualifying the at least one conversation assistance resource to assist the user with the predicted user need.

3. The system of claim 1 wherein the one or more profiles associated with the potential conversation assistance resources are selected based on the predicted user need.

4. The system of claim 1 wherein the predicted user need is predicted based on two or more user need scenarios.

5. The system of claim 1 wherein the identified at least one conversation assistance resource is an interactive conversation service.

6. The system of claim 1 wherein the identified at least one conversation assistance resource is associated with a profile, the profile being based at least one or more user signals associated with the conversation assistance resource.

7. The system of claim 1 wherein the user profile is generated from information collected about the user, the information collected about the user being in the form of one or more of the user signals.

8. The system of claim 1, wherein the first communication channel, the second communication channel, and the third communication channel are each a distinct connection using one or more distinct devices between two of the user, the at least one conversation assistance resource, and the communications manager.

9. A method comprising:
predicting a user need of a user having a user profile, the prediction based on a user signal of one or more user signals and the user profile, the user profile being stored in a user profile database;
matching the user profile associated with the user with one or more profiles associated with potential conversation assistance resources to determine whether the one or more profiles satisfy an assisting condition, the one or more profiles associated with the potential conversation assistance resources being stored in the user profile database;
identifying at least one conversation assistance resource responsive to a profile associated with the identified at least one conversation assistance resource satisfying the assisting condition, satisfaction of the assisting condition qualifying the at least one conversation assistance resource to assist the user with the predicted user need;
requesting and receiving confirmation from the identified at least one conversation assistance resource via a first communication channel indicating that the at least one conversation assistance resource is available to assist the user with the predicted user need;
requesting and receiving confirmation from the user via a second communication channel that the user is willing to be connected to the at least one conversation assistance resource; and
establishing a third communication channel between the user and the identified at least one conversation assistance resource responsive to receiving confirmation from the user and the identified at least one conversation assistance resource.

10. The method of claim 9 wherein the predicted user need is predicted based on two or more user need scenarios.

11. The method of claim 9 wherein the one or more user signals are associated with monitored user actions.

12. The method of claim 9 wherein the identified at least conversation assistance resource is another user, the profile associated with the at least one conversation assistance resource being a user profile associated with the another user.

13. The method of claim 9 wherein the identified at least one conversation assistance resource is an interactive conversation service.

14. The method of claim 9 wherein the identified at least one conversation assistance resource is associated with a profile, the profile being based at least one or more user signals associated with the conversation assistance resource.

15. The method of claim 9, wherein the first communication channel, the second communication channel, and the third communication channel are each a distinct connection using one or more distinct devices between two of the user, the at least one conversation assistance resource, and a communications manager.

16. One or more tangible processor-readable storage media embodied with instructions for executing on one or more processors and circuits of a device a process comprising:
- predicting a user need of a user having a user profile, the prediction based on a user signal of one or more user signals and the user profile;
- identifying at least one conversation assistance resource based on the predicted user need and a matching of the user profile with one or more profiles associated with potential conversation assistance resources to determine whether the at least one conversation assistance resource satisfies an assisting condition, satisfaction of the assisting condition qualifying the at least one conversation assistance resource to assist the user with the predicted user need;
- requesting and receiving confirmation from the identified at least one conversation assistance resource via a first communication channel indicating that the at least one conversation assistance resource is available to assist the user with the predicted user need;
- requesting and receiving confirmation from the user via a second communication channel that the user is willing to be connected to the at least one conversation assistance resource; and
- establishing a third communication channel between the user and the identified at least one conversation assistance resource responsive to receiving confirmation from the user and the identified at least one conversation assistance resource satisfies the assisting condition.

17. The one or more tangible processor-readable storage media of claim 16 wherein the one or more user profiles associated with the potential conversation assistance resources are selected based on the predicted user need.

18. The one or more tangible processor-readable storage media of claim 16 wherein the predicted user need is predicted based on two or more user need scenarios.

19. The one or more tangible processor-readable storage media of claim 16 wherein the one or more user signals are associated with monitored user actions.

20. The one or more tangible processor-readable storage media of claim 16 wherein the identified at least conversation assistance resource is another user, the profile associated with the at least one conversation assistance resource being a user profile associated with the another user.

21. The one or more tangible processor-readable storage media of claim 16 wherein the identified at least one conversation assistance resource is associated with a profile, the profile being based at least one or more user signals associated with the conversation assistance resource.

22. The one or more tangible processor-readable storage media of claim 16, wherein the first communication channel, the second communication channel, and the third communication channel are each a distinct connection using one or more distinct devices between two of the user, the at least one conversation assistance resource, and a communications manager.

* * * * *